(12) United States Patent
Ou-Yang et al.

(10) Patent No.: US 6,728,062 B1
(45) Date of Patent: Apr. 27, 2004

(54) DISK DRIVE BASE DESIGN FOR MODIFYING AIRFLOW GENERATED FROM ROTATION OF DISK

(75) Inventors: Jin Hui Ou-Yang, San Jose, CA (US); Hsueh-Chieh Wu, Menlo Park, CA (US); Lin Yang, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 90 days.

(21) Appl. No.: 10/112,336

(22) Filed: Mar. 29, 2002

(51) Int. Cl.⁷ .............................................. G11B 17/00
(52) U.S. Cl. .................................. 360/97.02; 360/97.01
(58) Field of Search .......................... 360/97.01–97.04; 369/263, 275.5

(56) References Cited

U.S. PATENT DOCUMENTS

| | | | | |
|---|---|---|---|---|
| 4,363,057 A | * | 12/1982 | Siverling et al. | 360/97.03 |
| 5,541,791 A | * | 7/1996 | Yamasaki et al. | 360/256.1 |
| 5,696,649 A | * | 12/1997 | Boutaghou | 360/97.03 |
| 6,147,834 A | * | 11/2000 | Srikrishna et al. | 360/97.02 |
| 6,271,987 B1 | * | 8/2001 | Allsup et al. | 360/97.03 |
| 6,369,977 B1 | * | 4/2002 | Imai et al. | 360/97.02 |
| 6,665,139 B2 | * | 12/2003 | Tokuyama et al. | 360/97.02 |

FOREIGN PATENT DOCUMENTS

| | | | |
|---|---|---|---|
| JP | 02000228079 A | * | 8/2000 |
| JP | 02000322870 A | * | 11/2000 |
| JP | 0326393 | * | 5/2003 |

\* cited by examiner

*Primary Examiner*—Allen Cao
(74) *Attorney, Agent, or Firm*—Won Tae C. Kim, Esq.; Milad G. Shara, Esq.; Alan W. Young, Esq.

(57) ABSTRACT

The base of a disk drive defines an interior shroud surface. The interior shroud surface is configured to follow a portion of the curvature of the disk at a distance from the outer diameter of the disk. The interior shroud surface of the base may define one or more channels for modifying the airflow developed as the disk rotates. The interior shroud surface defines an opening to enable the head stack assembly to pivot over the disk, which opening is bounded by a leading shroud portion and a trailing shroud portion. The leading shroud portion and/or the trailing shroud portion may also define a channel or channels for modifying the airflow that is developed as the disk rotates.

19 Claims, 8 Drawing Sheets

DISK DRIVE BASE DESIGN FOR MODIFYING AIRFLOW GENERATED FROM ROTATION OF DISK

BACKGROUND OF THE INVENTION

1. Field of the Invention

The present invention relates to disk drives. More particularly, the present invention relates to disk drives that include a base that contributes to reducing disk flutter induced track misregistration ("TMR").

2. Description of the Prior Art

A typical hard disk drive includes a head disk assembly ("HDA") and a printed circuit II board assembly ("PCBA"). The HDA includes at least one magnetic disk ("disk"), a spindle motor for rotating the disk, and a head stack assembly ("HSA") that includes a slider with at least one transducer or read/write element for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the slider toward the disk; and (3) a flex cable assembly that provides an electrical interconnect with minimal constraint on movement.

A typical HGA includes a load beam, a gimbal attached to an end of the load beam, and a slider attached to the gimbal. The load beam has a spring function that provides a "gram load" biasing force and a hinge function that permits the slider to follow the surface contour of the spinning disk. The load beam has an actuator end that connects to the actuator arm and a gimbal end that connects to the gimbal that supports the slider and transmits the gram load biasing force to the slider to "load" the slider against the disk. A rapidly spinning disk develops a laminar airflow above its surface that lifts the slider away from the disk in opposition to the gram load biasing force. The slider is said to be "flying" over the disk when in this state.

FIG. 1 is an exploded perspective view of a conventional disk drive 10. As shown, the disk drive 10 includes a HDA 12 and a printed circuit board assembly PCBA 14. The HDA 12 includes a disk drive base 16 and a cover 18 that collectively house magnetic disks 20, 22, 24. Each magnetic disk 20, 22, 24 contains a plurality of tracks for storing data. The magnetic disks 20, 22, 24 may be two-sided, and thus for example, the magnetic disk 24 is shown having a track 26 on an upper facing side and a track 28 (shown in phantom) on a lower facing side. The head disk assembly 12 further includes a spindle motor 30 for rotating the magnetic disks 20, 22, 24. The head disk assembly 12 further includes a HSA 32 and a pivot-bearing cartridge 34. The head stack assembly 32 includes a rotary actuator 36.

The rotary actuator 36 includes an actuator body 38 that has a bore and the pivot-bearing cartridge 34 engaged within the bore for facilitating the rotary actuator 36 to rotate between limited positions. The rotary actuator 36 further includes a coil portion 40 that extends from one side of the actuator body 38 to interact with a pair of permanent magnets 42 to form a Voice Coil Motor (VCM) for pivoting the rotary actuator 36. A plurality of actuator arms, the lowermost one of which being denoted 44, extend from an opposite side of the actuator body 38. As the disks 20, 22, 24 may be two sided, each of the actuator arms is attached to either one or two head gimbal assemblies associated with the adjacent sides of the disks 20, 22, 24. Each head gimbal assembly includes a head (the uppermost one being denoted 46) for reading and writing data to and from a respective recording surface of one of the respective disks 20, 22, 24.

A challenge faced by hard disk drive designers and manufacturers as they continually increase the capacities of contemporary hard disk drives is the phenomenon known as non repeatable run out ("NRRO"). Run out, either written into the servo tracks (usually denoted RRO) or occurring live during drive operation (NRRO), manifests itself as radial displacements of the read/write head(s) relative to the data tracks of the disk(s), caused by vibrations of either the HSA or disk pack (inc. spindle motor, disk(s), spacer(s), and clamp). As the storage capacity of magnetic disks increases, the number of data tracks per inch ("TPI") is increased, or conversely, the track width is decreased, leading to greater data density per unit area on the magnetic media. Since NRRO may degrade the data transfer performance to and from the magnetic media by increasing, for example, the frequency of off track errors, the ratio of root mean square (RMS) NRRO to track width must be maintained at a fairly constant value; thus, designers must ensure that NRRO decreases in proportion to track width.

Airflow within a hard disk drive may be divided into three regions, each characterized by different properties. The first region is located near the hub of the disk pack, where the relatively slow moving air develops an irregularly shaped core of laminar airflow. The second region's boundary ranges from the laminar core of the first region nearly to the OD of the disk. The higher velocity airflow within the second region is turbulent, particularly at the boundary with the first region. During operation, the heads must travel into and out of the irregularly shaped core of laminar airflow. The higher velocity of the airflow at and near the OD of the disk creates a vacuum-like effect and the pressure differences in the radial direction drive the air to flow unevenly outward, toward the OD of the disk and the third region.

The third region is the smallest of the three regions and yet is an important contributor to disk flutter induced TMR, which is the radial position error between the read/write transducer heads and the data track of a hard disk drive due to disk vibrations. The third region is bounded by the OD of the rotating disk(s) and the stationary shroud that defines the disk pack region of the base of the hard disk drive. This interface causes turbulent airflow that creates a great many small vortices near and against the shroud. Such vortices form by the interaction of the high speed developed by the air at the OD of the rotating disk, the stationary shroud and the viscous property of the air. If such turbulent airflow around the OD of the disk could be reduced, the component of TMR due to disk flutter could be reduced, with positive effects upon drive performance.

FIG. 2 is a perspective view of a conventional disk drive base 16. As shown therein, once the airflow (shown at reference numeral 202) induced by the rotating disks leaves the disk pack area 212, it also exerts an unsteady force on the HSA (shown in dashed lines at 32) and particularly on the actuator arms 44 thereof, which degrades the ability of the HSA 32 to precisely perform seek and track following operations. If the pattern of such airflow 202 could be modified so as to redirect it away from the HSA 32 and the actuator arms 44, the heads thereof may be controllable to a greater degree of precision than conventionally possible.

What are needed, therefore, are disk drives that are configured to reduce disk flutter induced TMNR. Also needed are disk drives in which the HSA resonances due to airflow are reduced.

SUMMARY OF THE INVENTION

Accordingly, this invention may be regarded as a disk drive, including: a base, the base defining a first interior surface and a second interior shroud surface that rises perpendicularly to the first interior surface; a disk; a spindle motor attached to the base for rotating the disk and a head stack assembly pivotally coupled to the base. The second interior surface is configured to follow a portion of the curvature of the disk at a distance from an outer diameter (OD) of the disk, the second interior shroud surface of the base defining a channel for modifying airflow developed as the disk rotates.

The disk drive may include a plurality of disks and the second interior shroud surface may define a channel for each of the plurality of disks. The disk drive may include a plurality of facing disks and the second interior shroud surface may define a channel between each two facing disks. The disk drive may define an outer diameter edge and the channel may be offset from the outer diameter edge. The disk may define an outer diameter edge and the channel may be aligned with the outer diameter edge. The channel may be configured to reduce turbulent airflow around the outer edge of the disk. The channel may run the entire length of the second interior shroud surface or a portion thereof. The channel may be continuous or may be discontinuous. The channel may define a regular or irregular cross-section.

According to another embodiment thereof, the present invention is a disk drive, comprising: a base, the base defining a first interior surface and a second interior shroud surface that rises perpendicularly to the first interior surface; a disk; a spindle motor attached to the base for rotating the disk, and a head stack assembly pivotally coupled to the base. The second interior surface is configured to follow a portion of the curvature of the disk at a distance from an outer diameter of the disk, the second interior shroud surface of the base defining an opening to enable the head stack assembly to pivot over the disk, the opening being bounded by a leading shroud portion and a trailing shroud portion, at least one of the leading shroud portion and the trailing shroud portion defining a channel for modifying airflow developed as the disk rotates.

The channel may be bounded by the first interior surface and a leading shroud portion surface that faces the first surface. A plurality of channels may be defined in the leading shroud portion. The channel may be bounded by the first interior surface and a trailing shroud portion surface that faces the first surface. A plurality of channels may be defined in the trailing shroud portion. The channel defined in the leading shroud portion may be shaped so as to redirect the airflow away from the head stack assembly. The channel defined in the trailing shroud portion may be shaped so as to redirect away from the head stack assembly.

The foregoing and other features of the invention are described in detail below and set forth in the appended claims.

DESCRIPTION OF THE PREFERRED EMBODIMENTS

Figure 1:
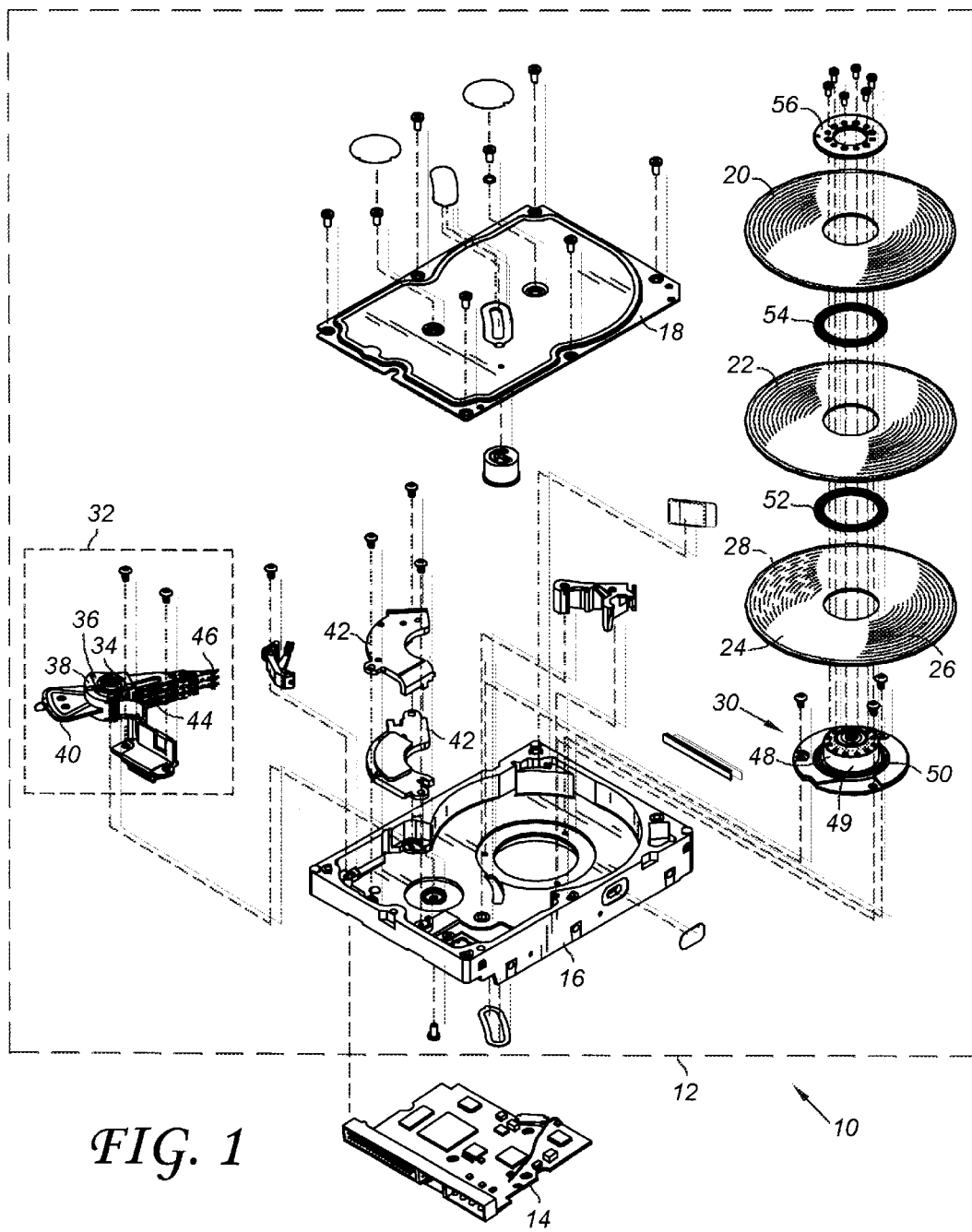
FIG. 1 is an exploded view of a conventional disk drive.
Figure 2:
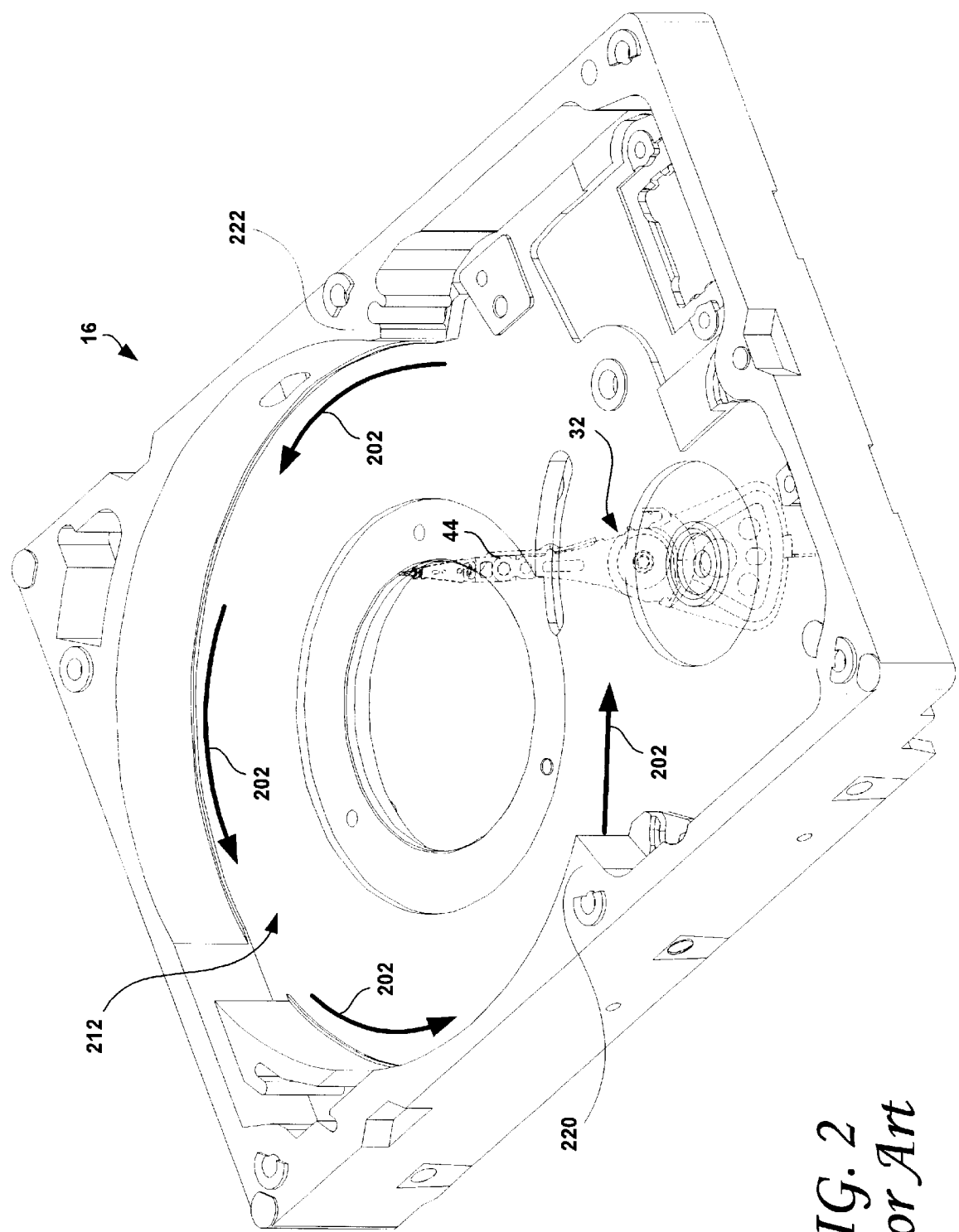
FIG. 2 is a perspective view of a conventional disk drive base.
Figure 3:
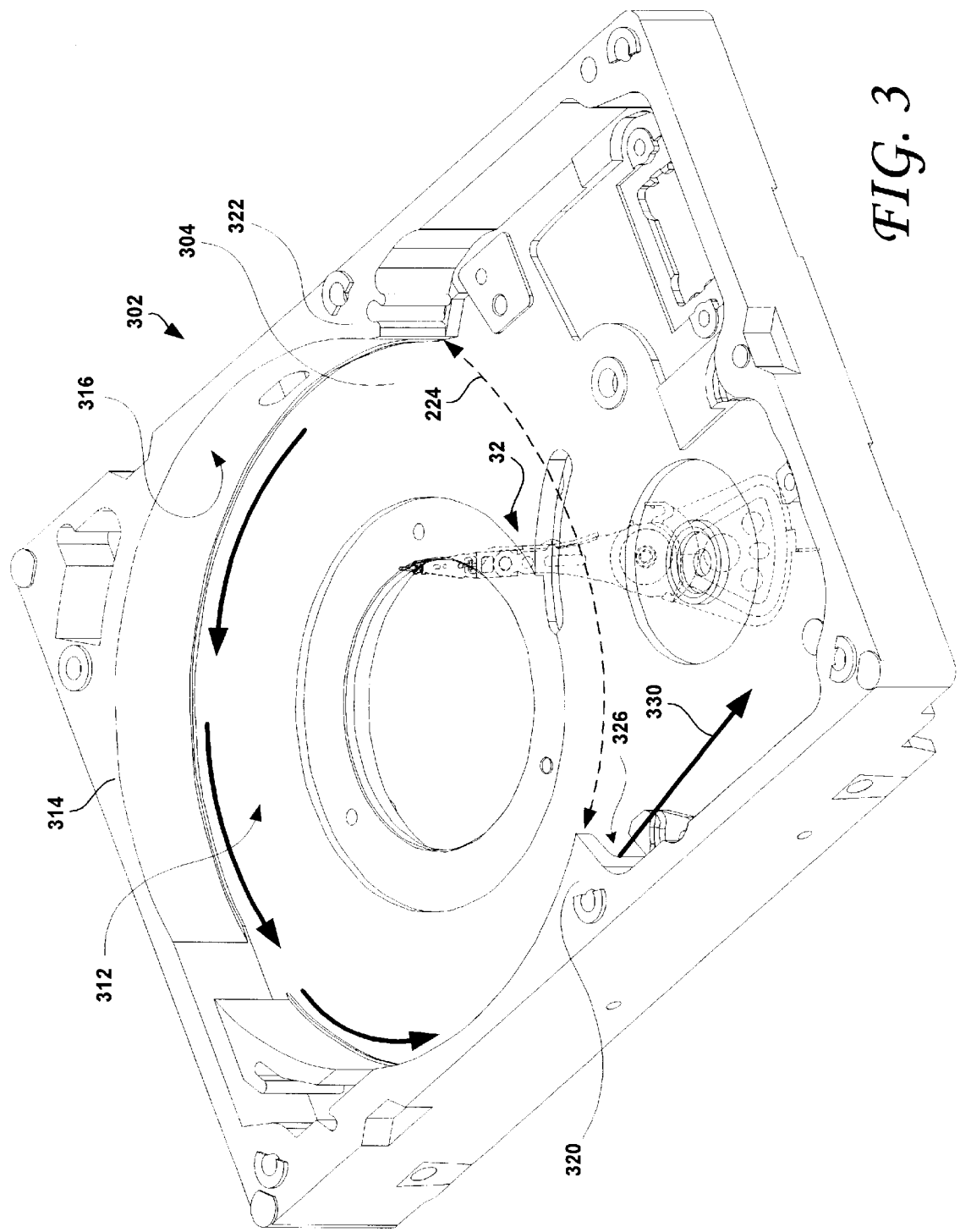
FIG. 3 is a perspective view of a disk drive base, according to an embodiment of the present invention.

FIG. 3 is a perspective view of a disk drive base, according to an embodiment of the present invention. As shown therein, the disk drive base defines a first interior surface 304 and a disk pack area 312 configured to receive the disk or disks, such as shown at 20, 22 and 28 in FIG. 1. The disk pack area 312 is bounded by a second interior surface 316 of an interior shroud 314. The second interior surface 316 rises perpendicularly to the first interior surface 304 and is curved so as to generally follow a portion of the curvature of the disk or disks at a distance from the outer diameter thereof The interior shroud 314 further defines an opening 224 to enable the head stack assembly 32 to pivot over the disk or disks. As shown, the opening 224 is bounded by a leading shroud portion 320 and a trailing shroud portion 322. The shape of the leading and trailing shroud portions 320, 322, according to an embodiment of the present invention, may be modified from their respective conventional configurations shown respectively in FIG. 2 at 220 and 222, to modify the airflow as the disk or disks rotate.

Whereas the leading shroud portion 220 of the conventional disk drive base 16 of FIG. 2 is shaped so as to direct the airflow 202 toward the HSA 32, according to one embodiment of the present invention, the leading shroud portion 320 shown in FIG. 3 defines a channel 326 for modifying airflow developed as the disk or disks rotate. Indeed, the channel 326 defined in the leading shroud portion 320 modifies the direction of the airflow exiting the disk pack area 312, as compared with the direction of the airflow exiting the disk pack area of the conventional disk drive base of FIG. 2. The channel 326 may redirect the airflow, as shown at reference numeral 330, away from the HSA 32 or may redirect the airflow 330 exiting the disk pack 312 toward the HSA 32 but toward a portion thereof that is less prone to negatively influence the operation thereof.

Figure 5:
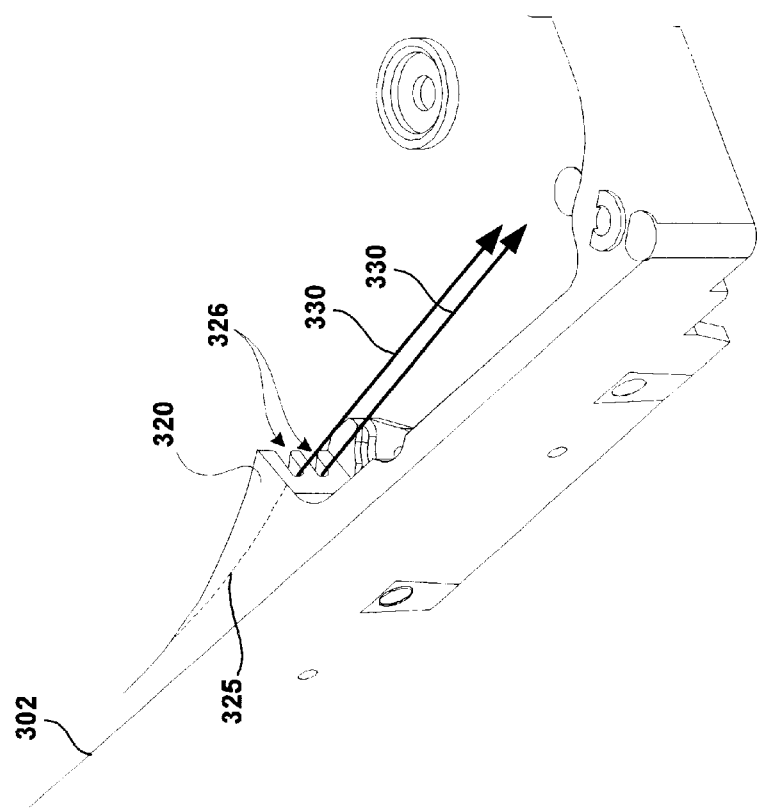
FIG. 5 is a perspective view of a portion of a disk drive base, according to yet another embodiment of the present invention.
Figure 4:
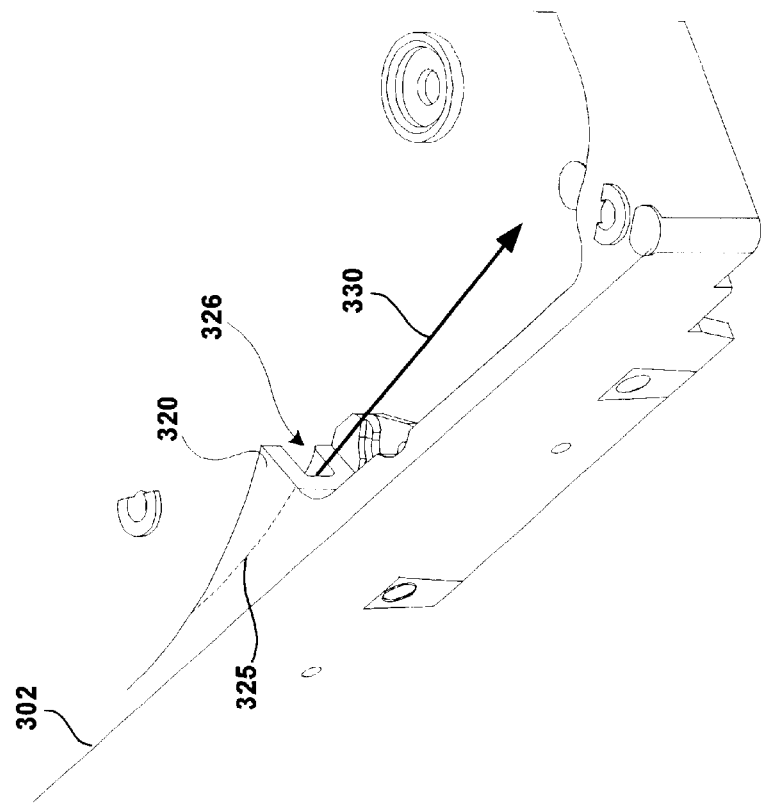
FIG. 4 is a perspective view of a portion of a disk drive base, according to another embodiment of the present invention.

The channel 326 in the leading shroud portion 320 may be configured in any manner that beneficially modifies the airflow exiting the disk pack are 312, as compared to conventional disk drive bases. For example, as shown in FIG. 3, the channel 326 may be bounded by the first interior surface 304 and a leading shroud portion surface that faces the first surface 304. Such a channel 326 may be formed by undercutting a conventional leading shroud portion down to the first surface 304, leaving a superior surface thereof (the surface of the leading shroud portion 320 that faces the top cover 18 when the top cover 18 is secured on the base 302) intact. Alternatively, the undercutting of the leading shroud portion 320 need not be carried out down to the level of the first surface 304. For example, FIG. 4 shows an embodiment of the present invention wherein the leading shroud portion 320 is undercut within its width to define a channel 326 entirely bounded within the width of the leading shroud portion 320. Alternatively still, a plurality of channels 326 may be defined within the leading shroud portion 320. An example of a leading shroud portion 320 defining a plurality of channels 326 is shown in FIG. 5, in which two channels 326 have been cut, milled or otherwise formed in the leading shroud portion 320. The undercutting of the leading shroud portion 320 may, for example, be carried out along the dashed line 325 shown in FIGS. 4 and 5.

The channel 326 defined in the leading shroud portion 320 may have a rectangular cross-section. Alternatively, the channel 326 may have a non-rectangular cross-section. Indeed, the shape of the cross-section of the channel 326 may be freely chosen according to the prevailing manufacturing constraints, acoustic considerations and/or other factors, provided that the channel 326 is effective to modify airflow developed as the disk or disks rotate. That is, the channel 326 (wherever located and however configured) should be effective in modifying the direction of the airflow impinging upon the leading shroud portion 320.

Figure 6:
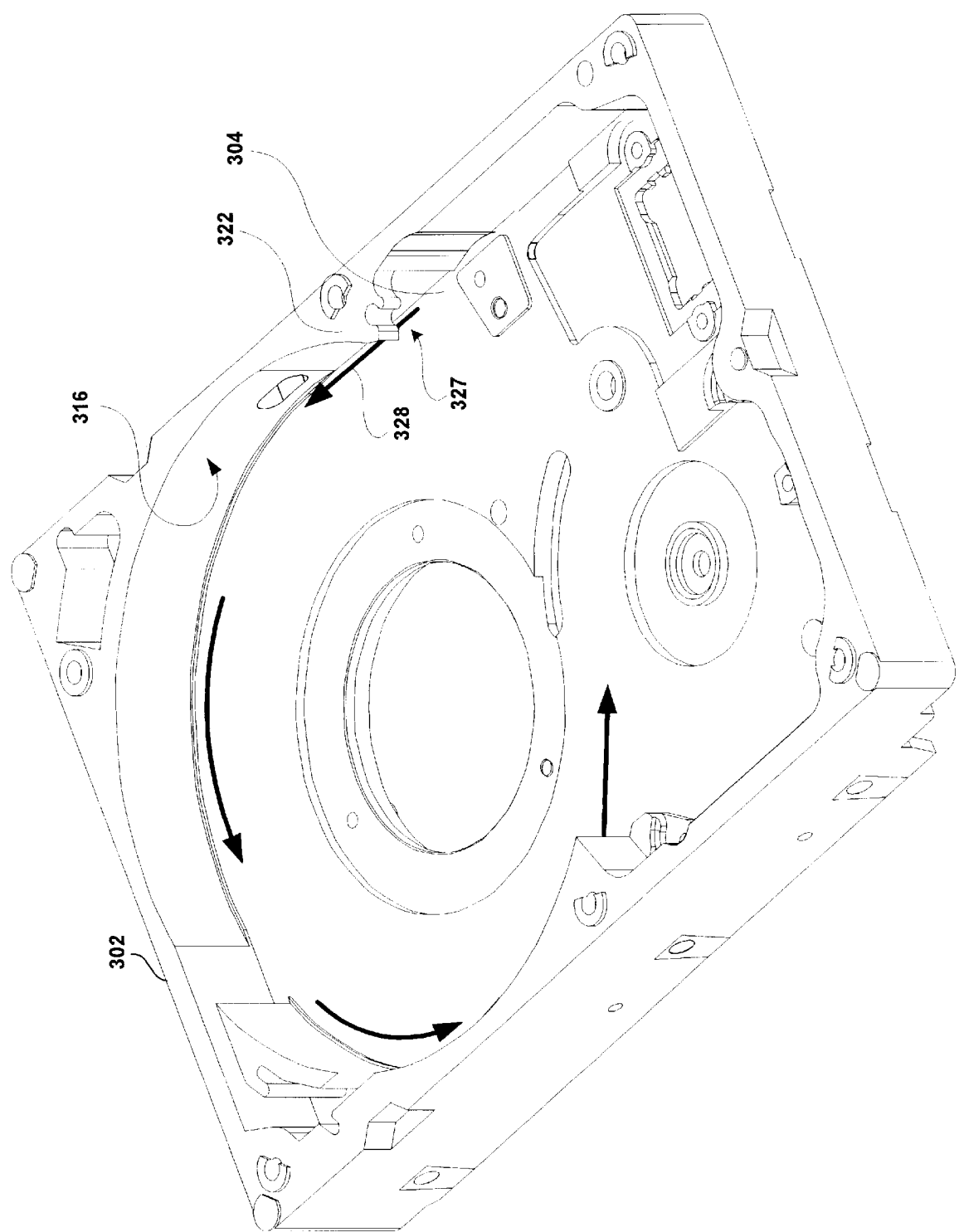
FIG. 6 is a perspective view of a disk drive base, according to a still further embodiment of the present invention.
Figure 8:
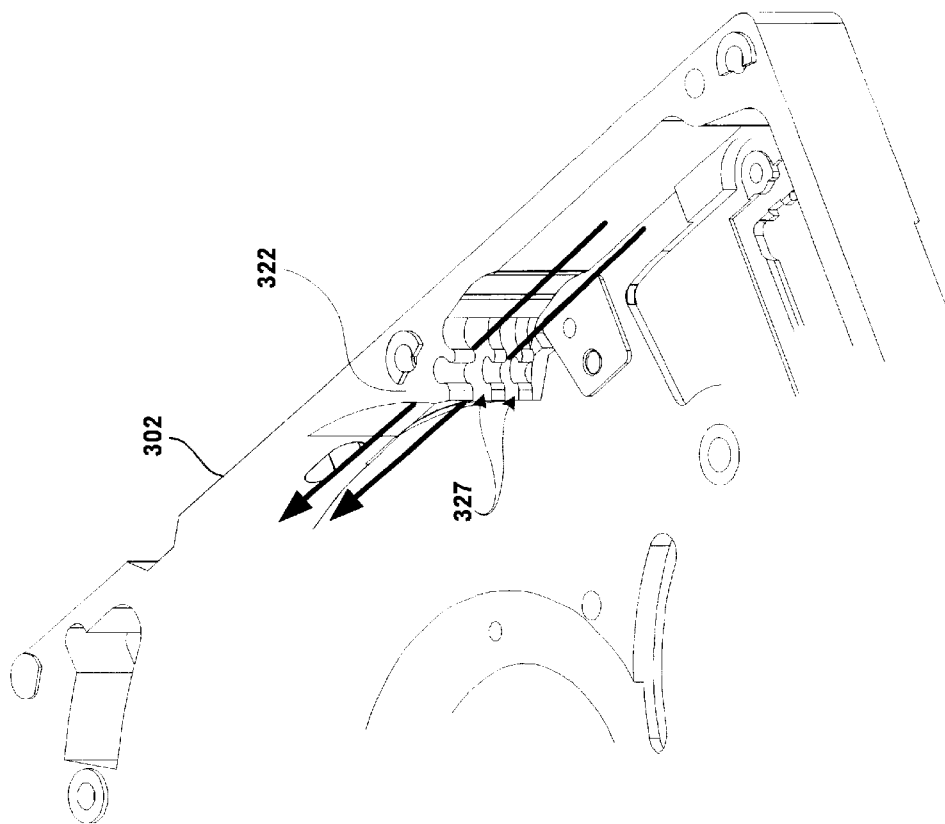
FIG. 8 is a perspective view of a portion of a disk drive base, according to another embodiment of the present invention.
Figure 7:
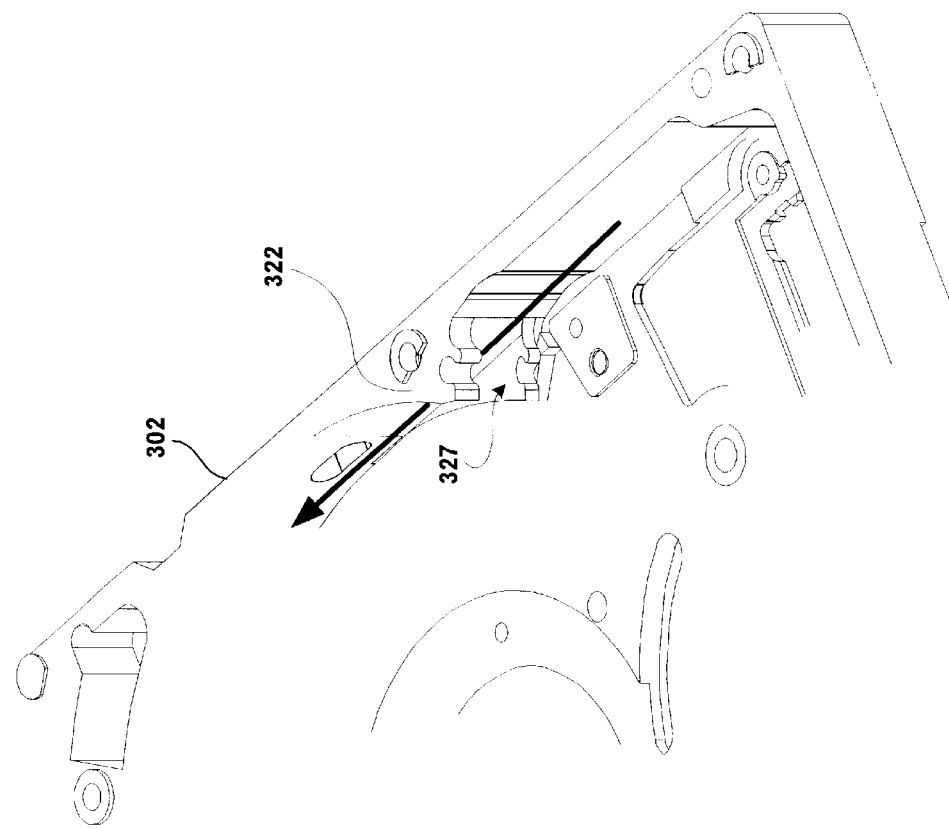
FIG. 7 is a perspective view of a portion of a disk drive base, according to still another embodiment of the present invention.

Similarly, the trailing shroud portion 322 may define a channel 327, as shown in FIGS. 6, 7 and 8. Such a channel 327 allows airflow to exit the VCM-HSA area and directs the airflow toward the downstream portion of the disk pack area 312 (i.e., toward the direction of arrow 328). The channel 327 defined in the trailing shroud portion 322 may be configured in any manner that beneficially modifies the airflow exiting the VCM-HSA area, as compared to conventional disk drive bases. For example, as shown in FIG. 6, the channel 327 may be bounded by the first interior surface 304 and a trailing shroud portion surface that faces the first surface 304. Such a channel 327 may be formed by undercutting a conventional trailing shroud portion down to the first surface 304, leaving a superior surface thereof (the surface of the trailing shroud portion 322 that faces the top cover 18 when the top cover 18 is secured on the base) intact. Alternatively, the undercutting of the trailing shroud portion 322 need not be carried out down to the level of the first surface 304. For example, FIG. 7 shows an embodiment of the present invention wherein the trailing shroud portion 322 is undercut within its width to define a channel 327 entirely bounded within the width of the trailing shroud portion 322. Alternatively still, a plurality of channels 327 may be defined within the trailing shroud portion 322. An example of a base 302 including a trailing shroud portion 322 defining a plurality of channels 327 is shown in FIG. 8, in which two channels 327 have been cut, milled or otherwise formed in the trailing shroud portion 322.

Similarly to the channel 326 in the leading shroud portion 322, the channel or channels 327 defined in the trailing shroud portion 322 may have a rectangular cross-section. Alternatively, the channel or channels 327 may have a non-rectangular cross-section. Indeed, the shape of the cross-section of the channel 327 may be freely chosen according to the prevailing manufacturing constraints, acoustic considerations and/or other factors, provided that the channel 327 is effective to modify airflow developed as the disk or disks rotate. That is, the channel 327 (wherever located and however configured) should be effective in modifying the direction of the airflow impinging upon the trailing shroud portion 320.

According to the present invention, a channel 326 may be defined in the leading shroud portion 320. According to another embodiment of the present invention, a channel 327 may be defined in the trailing shroud portion 322. However, greater reduction in TMR may be achieved when both the leading and trailing shroud portions 320, 322 define one or more respective channels 326, 327, as shown in FIG. 10. The channel or channels 326 modify the direction of the airflow developed from the rotating disks within the disk pack area 312 toward the VCM area of the base 302 and away from the HGA area. This reduces the contribution of the airflow to disk flutter, actuator arm turbulence and HSA windage. The channel or channels 327 defined in the trailing shroud portion 322, by redirecting airflow away from the HSA 310 and toward the disk pack area 312 reduces airflow disturbances to the read/write heads and further reduces TMR. As also shown in FIG. 9, additional benefits may be obtained, through the incorporation of a channel or channels 318 in the shroud 314, as shown underlying the cutaway view of the disk 20 and as discussed below relative to FIG. 9.

Figure 9:
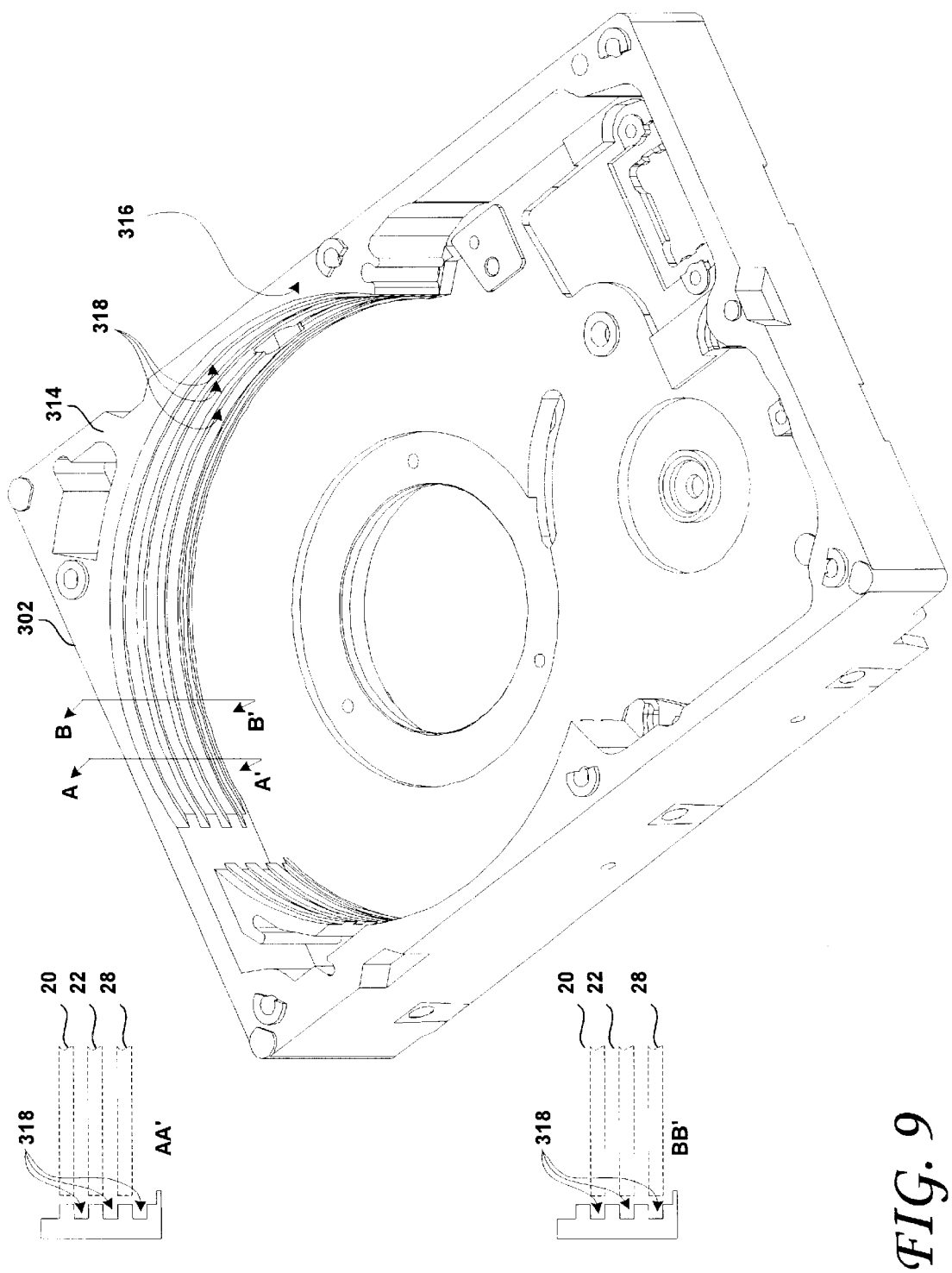
FIG. 9 is a perspective view of a disk drive base, according to yet another embodiment of the present invention.
Figure 10:
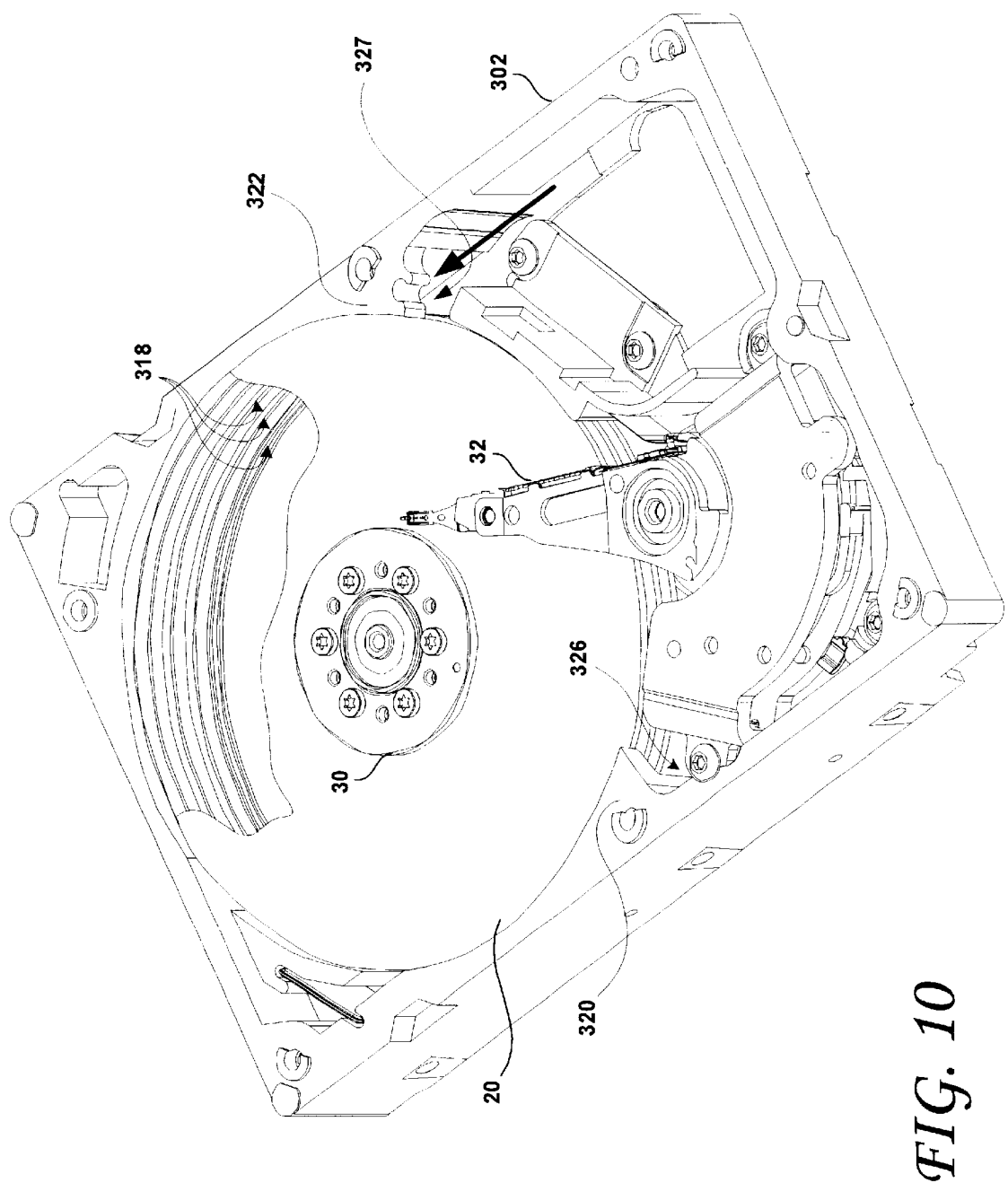
FIG. 10 is a perspective view of a disk drive according to an embodiment of the present invention (shown with the top cover removed for illustrative purposes).

FIG. 9 is a perspective view of a disk drive base, according to yet another embodiment of the present invention. As shown, the second interior surface 316 defines one or more channels 318 within the interior shroud 314 for modifying airflow developed as the disk(s) 20, 22 and 28 rotate. For example, the second interior surface 316 may define a channel 318 within the interior shroud 314 for each disk of the disk drive. As best seen in the cross-sectional view taken along line AA', the disk drive base 302 of FIG. 9 is configured for 3 disks and the second interior surface 316 defines three channels 318. According to an embodiment of the present invention shown in the cross-sectional view AA', each of the channels 318 may be offset from the outer diameter edge of the disks 20, 22 and 28. That is, the OD edges of the disks 20, 22, 28 may be aligned with the uncut surface of the second interior surface 316. Alternatively, the channels 318 may be aligned with (or only somewhat offset relative to) respective edges of the OD of the disks 20, 22 and 28, as shown in the cross-sectional view BB'.

The channel(s) 318 may run the entire length of the second interior surface 316, as shown in FIG. 9. Alternatively, the channel(s) 318 may only extend over a portion of the length of the second interior surface 316. The channel(s) 318 may be continuous as shown in FIG. 9 or may be discontinuous and include a plurality of discrete channel or trench-like features. The channel(s) 318 may have a regular geometric cross-section (rectangular, triangular, round or oval, for example) or may be irregular in cross-section. However, configured, the channel(s) 318 according to the present invention should be effective in reducing turbulent airflow around the OD of the disk(s) of the drive. The reduction in turbulent airflow around the OD of the disks may be attributed to the creation of a localized area of relatively lower pressure in the channels 318 adjacent to the OD of the rotating disks, which draws at least part of the turbulent airflow away from the OD of the rotating disk(s).

Additional TMR reduction may be obtained by including channel(s) 326 on the leading shroud portion 320, channel(s) 327 on the leading shroud portion 322 and channel(s) 318 defined within the second interior surface 316 of the shroud 314, all of which tend to reduce the aerodynamic excitation energy applied to the disk(s), on the actuator arms and on the HSA by shunting airflow away from these structures. In turn, reducing the energy applied to the disk, arms and HSA should reduce disk flutter-induced TMR, unwanted actuator arm turbulence and HSA resonance, all of which degrade the performance of the drive. Incorporating some or all of the structural features described herein contribute to an airflow pattern that more closely tracks the interior perimeter of the base 302, rather than impinging upon the disks and the head stack assembly. In turn, modifying the airflow in this manner also evens out the shape of the generally rosette-shaped core of laminar airflow toward the center of the rotating disks, making it easier for the heads to travel between the core of laminar airflow and the surrounding turbulent airflow.

What is claimed is:

1. A disk drive, comprising:
   a base, the base defining a first interior surface and a second interior shroud surface that rises perpendicularly to the first interior surface;
   a disk;
   a spindle motor attached to the base for rotating the disk, and
   a head stack assembly pivotally coupled to the base, wherein the second interior shroud surface is configured to follow a portion of the curvature of the disk at a distance from an outer diameter (OD) of the disk, the second interior shroud surface of the base defining a channel for modifying airflow developed as the disk rotates.

2. The disk drive of claim 1, further including a plurality of disks and wherein the second interior shroud surface defines a channel for each of the plurality of disks.

3. The disk drive of claim 1, further including a plurality of facing disks and wherein the second interior shroud surface defines a channel between each two facing disks.

4. The disk drive of claim 1, wherein the disk defines an outer diameter edge and wherein the channel is offset from the outer diameter edge.

5. The disk drive of claim 1, wherein the disk defines an outer diameter edge and wherein the channel is aligned with the outer diameter edge.

6. The disk drive of claim 1, wherein the channel is configured to reduce turbulent airflow around an outer edge of the disk.

7. The disk drive of claim 1, wherein the channel runs an entire length of the second interior shroud surface.

8. The disk drive of claim 1, wherein the channel runs a portion of a length of the second shroud interior surface.

9. The disk drive of claim 1, wherein the channel is continuous.

10. The disk drive of claim 1, wherein the channel is discontinuous.

11. The disk drive of claim 1, wherein the channel defines a regular cross-section.

12. The disk drive of claim 1, wherein the channel defines an irregular cross-section.

13. A disk drive, comprising:
    a base, the base defining a first interior surface and a second interior shroud surface that rises perpendicularly to the first interior surface;
    a disk;
    a spindle motor attached to the base for rotating the disk, and
    a head stack assembly pivotally coupled to the base, wherein the second interior shroud surface is configured to follow a portion of the curyature of the disk at a distance from an outer diameter of the disk, the second interior shroud surface of the base defining an opening to enable the head stack assembly to pivot over the disk, the opening being bounded by a leading shroud portion and a trailing shroud portion, at least one of the leading shroud portion and the trailing shroud portion defining a channel for modifying airflow developed as the disk rotates.

14. The disk drive of claim 13, wherein the channel is bounded by the first interior surface and a leading shroud portion surface that faces the first surface.

15. The disk drive of claim 13, wherein a plurality of channels are defined in the leading shroud portion.

16. The disk drive of claim 13, wherein the channel is bounded by the first interior surface and a trailing shroud portion surface that faces the first surface.

17. The disk drive of claim 13, wherein a plurality of channels are defined in the trailing shroud portion.

18. The disk drive of claim 13, wherein the channel defined in the leading shroud portion is shaped so as to redirect the airflow away from the head stack assembly.

19. The disk drive of claim 13, wherein the channel defined in the trailing shroud portion is shaped so as to redirect away from the head stack assembly.

\* \* \* \* \*